(12) United States Patent
Hayes et al.

(10) Patent No.: US 11,657,458 B2
(45) Date of Patent: May 23, 2023

(54) DATA PROCESSING SYSTEM FOR SECURE DATA SHARING AND CUSTOMIZED OUTPUT GENERATION

(71) Applicant: Allstate Insurance Company, Northbrook, IL (US)

(72) Inventors: Howard Hayes, Glencoe, IL (US); Sunil Chintakindi, Menlo Park, CA (US); Surender Kumar, Palatine, IL (US); Tim Gibson, Barrington, IL (US)

(73) Assignee: Allstate Insurance Company, Northbrook, IL (US)

( * ) Notice: Subject to any disclaimer, the term of this patent is extended or adjusted under 35 U.S.C. 154(b) by 429 days.

(21) Appl. No.: 16/897,726

(22) Filed: Jun. 10, 2020

(65) Prior Publication Data
US 2021/0390625 A1    Dec. 16, 2021

(51) Int. Cl.
*G06Q 40/08*    (2012.01)
*H04L 9/40*     (2022.01)
(Continued)

(52) U.S. Cl.
CPC ........... *G06Q 40/08* (2013.01); *G06F 11/302* (2013.01); *G06F 11/3495* (2013.01);
(Continued)

(58) Field of Classification Search
CPC ............................... H04M 3/56; G06Q 50/265
See application file for complete search history.

(56) References Cited

U.S. PATENT DOCUMENTS

| 5,797,134 A | 8/1998 | McMillan et al. |
| 5,809,478 A | 9/1998 | Greco et al. |
| (Continued) |

FOREIGN PATENT DOCUMENTS

| CN | 103941037 A | 7/2014 | | |
| EP | 2523444 A1 * | 11/2012 | ......... | H04L 12/1818 |
| (Continued) |

OTHER PUBLICATIONS

International Search Report and Written Opinion of The International Searching Authority for PCT/US2021/025397 dated Jun. 23, 2021 (64 pages).
(Continued)

*Primary Examiner* — Patrick McAtee
*Assistant Examiner* — Nakia Leffall-Allen
(74) *Attorney, Agent, or Firm* — Polsinelli PC

(57) ABSTRACT

Aspects of the disclosure relate to computing platforms that utilize third party data for customized output generation. A computing platform may receive encrypted data corresponding to a travel history. The computing platform may decrypt a portion of the encrypted data, resulting in first decrypted travel history data. The computing platform may direct a user device to display the first decrypted travel history data, along with a first option to continue decrypting a subsequent portion of the encrypted data and a second option to delete the first decrypted travel history data. After receiving a selection of the first option, the computing platform may decrypt the subsequent portion of the encrypted data. After determining that the encrypted data is fully decrypted, the computing platform may process the decrypted data to generate a customized product output, and may direct the user device to display the customized product output.

9 Claims, 12 Drawing Sheets

(51) Int. Cl.
*G06Q 10/107* (2023.01)
*G06Q 30/018* (2023.01)
*G06Q 50/26* (2012.01)
*G06F 11/30* (2006.01)
*G06F 11/34* (2006.01)
*G06Q 50/30* (2012.01)
*H04W 12/033* (2021.01)

(52) U.S. Cl.
CPC ....... *G06Q 10/107* (2013.01); *G06Q 30/0185* (2013.01); *G06Q 50/265* (2013.01); *G06Q 50/30* (2013.01); *H04L 63/0428* (2013.01); *H04W 12/033* (2021.01); *G06Q 2220/10* (2013.01)

(56) References Cited

U.S. PATENT DOCUMENTS

| | | | |
|---|---|---|---|
| 8,086,523 | B1 | 12/2011 | Palmer |
| 8,280,752 | B1 | 10/2012 | Cripe et al. |
| 8,332,242 | B1 | 12/2012 | Medina, III |
| 8,332,244 | B1 | 12/2012 | Karam et al. |
| 8,560,436 | B2 | 10/2013 | Ingram et al. |
| 8,620,785 | B1 | 12/2013 | Wilks et al. |
| 8,660,864 | B2 | 2/2014 | Krause et al. |
| 8,838,498 | B2 | 9/2014 | Ross |
| 8,854,199 | B2 | 10/2014 | Cook et al. |
| 8,996,234 | B1 | 3/2015 | Tamari et al. |
| 9,141,995 | B1 | 9/2015 | Brinkmann et al. |
| 9,390,452 | B1 | 7/2016 | Biemer et al. |
| 9,483,795 | B1 | 11/2016 | Warden et al. |
| 9,773,281 | B1 | 9/2017 | Hanson |
| 9,818,154 | B1 | 11/2017 | Wilbert et al. |
| 9,830,663 | B2 | 11/2017 | Roberts et al. |
| 9,932,033 | B2 | 4/2018 | Slusar et al. |
| 9,984,419 | B1 | 5/2018 | Manzella et al. |
| 9,984,420 | B1 | 5/2018 | Manzella et al. |
| 9,996,811 | B2 | 6/2018 | Matus et al. |
| 2004/0088204 | A1 | 5/2004 | Plum et al. |
| 2006/0267857 | A1 | 11/2006 | Zhang et al. |
| 2007/0116299 | A1 | 5/2007 | Vanderwall et al. |
| 2008/0306678 | A1 | 12/2008 | Miyawaki |
| 2009/0076912 | A1 | 3/2009 | Rajan et al. |
| 2010/0223078 | A1* | 9/2010 | Willis ................ G06Q 40/08 715/811 |
| 2011/0035284 | A1 | 2/2011 | Moshfeghi |
| 2011/0106370 | A1 | 5/2011 | Duddle et al. |
| 2011/0196571 | A1 | 8/2011 | Foladare et al. |
| 2011/0213628 | A1 | 9/2011 | Peak et al. |
| 2012/0250938 | A1 | 10/2012 | DeHart |
| 2012/0252485 | A1 | 10/2012 | Wolverton et al. |
| 2013/0006674 | A1 | 1/2013 | Bowne et al. |
| 2013/0018541 | A1 | 1/2013 | Raz et al. |
| 2013/0191270 | A1 | 7/2013 | Carragher |
| 2013/0274955 | A1 | 10/2013 | Rosenbaum |
| 2013/0304586 | A1 | 11/2013 | Angles et al. |
| 2013/0322632 | A1 | 12/2013 | Manges |
| 2013/0325517 | A1 | 12/2013 | Berg |
| 2013/0339065 | A1 | 12/2013 | Denning et al. |
| 2014/0019171 | A1 | 1/2014 | Koziol |
| 2014/0222469 | A1 | 8/2014 | Stahl et al. |
| 2014/0222798 | A1 | 8/2014 | Want et al. |
| 2014/0257869 | A1 | 9/2014 | Binion et al. |
| 2015/0004934 | A1 | 1/2015 | Qian et al. |
| 2015/0025917 | A1 | 1/2015 | Stempora |
| 2015/0112731 | A1 | 4/2015 | Binion et al. |
| 2015/0161738 | A1 | 6/2015 | Stempora |
| 2016/0063235 | A1 | 3/2016 | Tussy |
| 2016/0283963 | A1* | 9/2016 | Zafiroglu ............... G06Q 30/02 |
| 2017/0255966 | A1* | 9/2017 | Khoury ................ B60W 40/00 |
| 2017/0339525 | A1 | 11/2017 | Schrader et al. |
| 2018/0218452 | A1* | 8/2018 | Guensler ............... G06Q 40/08 |
| 2018/0308100 | A1 | 10/2018 | Haukioja et al. |
| 2019/0102826 | A1 | 4/2019 | Rohrssen et al. |
| 2020/0062274 | A1* | 2/2020 | Kowal .................. G07C 5/0816 |
| 2020/0104876 | A1* | 4/2020 | Chintakindi ........... A61B 5/1112 |
| 2020/0317216 | A1 | 10/2020 | Konrardy et al. |

FOREIGN PATENT DOCUMENTS

| | | | |
|---|---|---|---|
| KR | 101341986 B1 | 12/2013 | |
| WO | WO-2010062899 A1 * | 6/2010 | ......... G06Q 30/0201 |
| WO | 2016028228 A1 | 2/2016 | |

OTHER PUBLICATIONS

Popa et al. "Building web applications on top of encrypted data using Mylar." IIth {USENIX} Symposium on Networked Systems Design and Implementation ({NSDI} 14). 2014. Apr. 4, 2014 (Apr. 4, 2014) Retrieved on May 25, 2021 (May 25, 2021) from https://www.usenix.org/conference/nsdi14/technical-sessions/presentation/popa.

Jun. 8, 2021—U.S. Notice of Allowance—U.S. Appl. No. 16/582,495.

Dean Macri, "Understanding Mobile Coupons", 2008 (Year: 2008).

Mar. 9, 2021—U.S. Final Office Action—U.S. Appl. No. 16/582,544.

Nakashima, Ryan, AP Exclusive: Google tracks your movements, like it or not, downloaded from https://apnews.com/article/828aefab64d4411bac257a07c1af0ecb on Mar. 3, 2021, and dated Aug. 13, 2018 (Year: 2018).

Saiprasert et al, Driver Behaviour Profiling using Smartphone Sensory Data in a V2I Environment, 2014 International Conference on Connected Vehicles and Expo (ICCVE), pp. 552-557.

Zheng et al, Mining Interesting Locations and Travel Sequences from GPS Trajectories, International World Wide Web Conference 2009 Madrid Spain, pp. 791-800.

Sharma et al, Big data learning and suggestions in modern apps, IOP Conf. Series: Materials Science and Engineering 263 (2017), pp. 1-8.

Zhu et al, Design of Driving Behavior Pattern Measurements Using Smartphone Global Positioning System Data, International Journal of Transportation Science and Technology, vol. 2, No. 4, 2013, pp. 269-288.

Fisher, Social media intelligence and profiling in the insurance industry . . . it's not only the price you pay that will be affected, downloaded from <https://medium.com/privacy-international/social-media-intelligence-and-profiling-in-the-insurance-industry-4958fd11f86f> on Oct. 10, 2018.

Clark, et al., Unleashing the value of advanced analytics in insurance, downloaded from <https://www.mckinsey.com/industries/financial-services/our-insights/unleashing-the-value-of-advanced-analytics-in-insurance> on Oct. 10, 2018.

Intel Corporation, Deliver innovative insurance services through predictive analytics, downloaded from <https://www.intel.com/content/dam/www/public/us/en/documents/reference-architectures/innovative-insurance-services-through-predictive-analytics-brief.pdf> on Sep. 25, 2019.

Ha, Young, In Few Years, Social Network Data May Be Used in Underwriting, downloaded from <https://www. insurancejournal.com/news/national/2011/10/13/219764.htm> on Oct. 10, 2018.

Nov. 23, 2020—U.S. Non-Final Office Action—U.S. Appl. No. 16/582,579.

May 3, 2021—U.S. Final Office Action—U.S. Appl. No. 16/582,579.

Sep. 25, 2020—U.S. Non-Final Office Action—U.S. Appl. No. 16/582,495.

Jan. 29, 2021—U.S. Final Office Action—U.S. Appl. No. 16/582,495.

Sedzielewski, Mike, "How to Create Advanced Coupon Campaigns", 2017 (Year: 2017).

Dec. 23, 2020—U.S. Non-Final Office Action—U.S. Appl. No. 16/582,544.

Cook, Steve, "How the Selfie is Revolutionizing Mobile Payments!" from Finextra.com, downloaded from https://www.finextra.com/blogposting/12336/how-the-selfie-is-revolutionising-mobile-payments on Dec. 17, 2020, and dated Mar. 8, 2016 (Year: 2016).

Thadani, Trisha, "Companies Try Out Selfies as Password Alternatives", from The Wall Street Journal, downloaded from https://www.

(56) References Cited

OTHER PUBLICATIONS wsj.com/articles/companies-try-out-selfies-as-password-alternatives-1476661046 on Dec. 17, 2020, and dated Oct. 17, 2016 )Year: 2016).

Liao, Shannon, "Facebook Uses Selfies as Login Authentication for Suspicious Actifity", from TheVerge.com, downloaded from https://www.theverge.com/2017/11/29/16716278/facebook-tests-selfies-login-verification-face on Dec. 17, 2020, and date Nov. 29, 2017 (Year: 2017).

Vincent, James, "MasterCard Unveils Selfie Security Checks, Says Heartbeat Authentication Could Follow", from TheVerge.com, downloaded from https://wwwtheverge.com/2016/2/23/11098540/mastercard-facial-recognition-heartbeat-security on Dec. 17, 2020, and dated Feb. 23, 2016 (Year: 2016).

Storm, David, "The Rise of the Selfie Authentication as a New Security Factor", from SecurityIntelligence.com downloaded from https://securityintelligence.com/the-rise-of-the-selfie-authentication-as-a-new-security-factor/ on Dec. 17, 2020, and dated Jul. 27, 2016 (Year: 2016).

\* cited by examiner

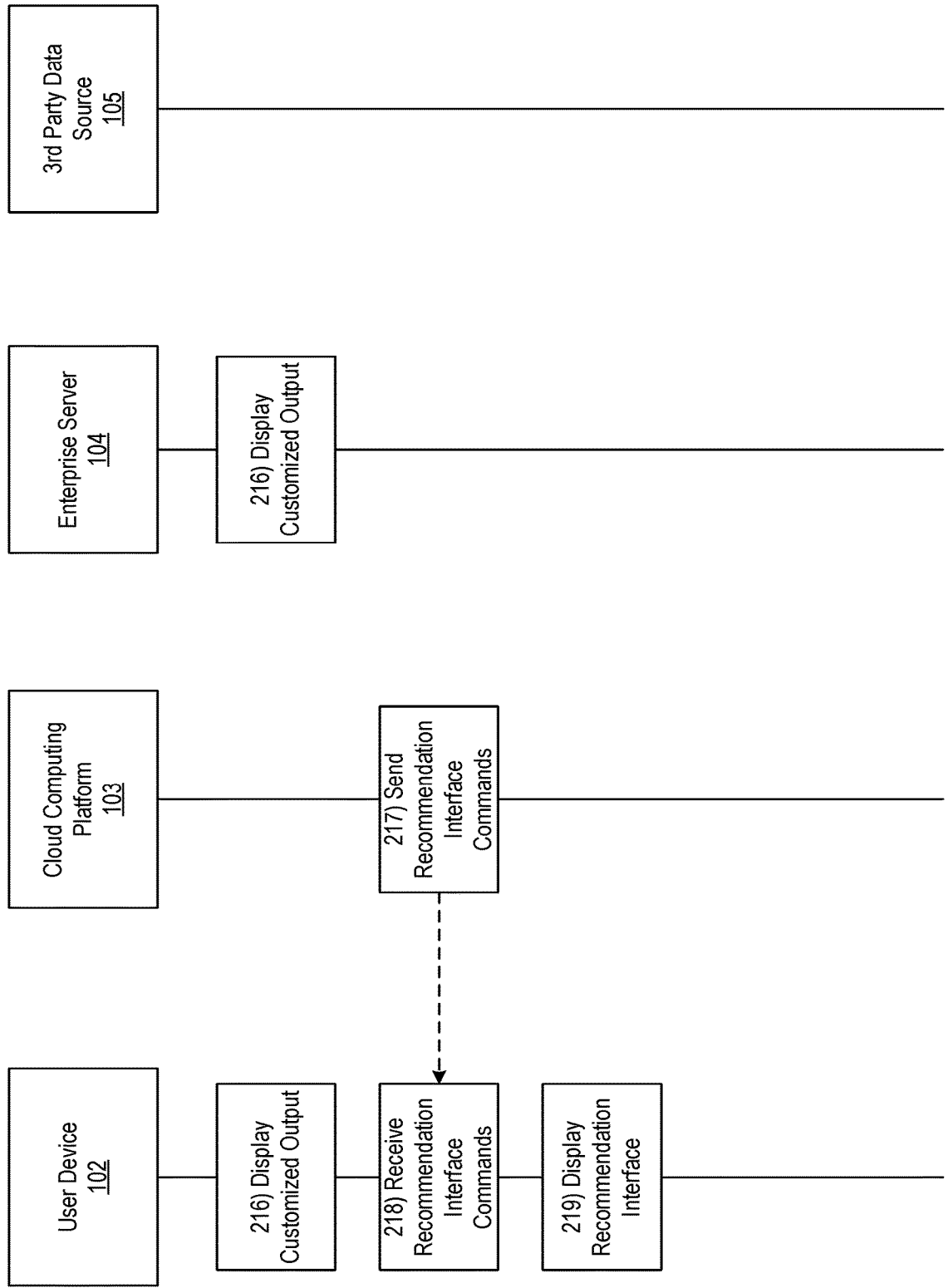

505

Since you are a customer of "Third Party Organization," you may qualify for a lower price.

Interested in seeing if you do? X% of people save at least Y%.

It is confidential and easy. Click here to learn more.

- Confidentially link your mobility or travel data from "Third Party Organization(s)" to see if you qualify for a lower price
- We won't save your data - it's yours, not ours!
- We will analyze your mobility patterns, like how often and where you drive
- Your price won't be higher than the quote you just received
- You can bail out at anytime by pressing this button

GET ME OUT OF HERE

Select data to include:

1) Location history ☑

2) Email ☑

3) Maps ☑

GET ME OUT OF HERE

805

Your typical mobility patterns look like this:

Map

GET ME OUT OF HERE

905
Here are some key stats we calculate to see if you qualify for a lower price:
|  | US Avg: | You: |
|---|---|---|
| Approximate annual miles driven: | 16,000 | 12,000 |
| % Highway miles: | 40% | 34% |
| Most common route: | Point A to Point B | |
Trip mileage: 24.5 miles
Frequency: 4 times per week
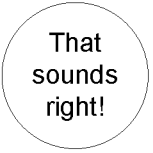 That sounds right!
 GET ME OUT OF HERE
FIG. 9
1005
Based on your mobility patterns, you qualify for a lower price!
$625 (that's a 20% savings!)
 Buy
 GET ME OUT OF HERE
FIG. 10

1105

We can also provide a price for life insurance. It's just as simple as auto insurance and is totally private.

Click here to learn more.

DATA PROCESSING SYSTEM FOR SECURE DATA SHARING AND CUSTOMIZED OUTPUT GENERATION

BACKGROUND

Aspects of the disclosure relate to enhanced data security and customized output generation. Many organizations and individuals evaluate historical data to generate customized product outputs. In many instances, however, individuals may be reluctant to share any more personal information than is necessary to generate the customized product outputs (e.g., due to concerns about data privacy), which may result in sub-optimal analysis of an individual and inaccurate output generation. Such inaccuracies may result in unnecessary expenditure of computing resources in the generation of customized outputs that ultimately might not be purchased or otherwise desired. Furthermore, even if access to historical data is granted, in some instances, enterprise organizations may initially have insufficient data to generate customized product outputs for an individual, and may have to wait for a period of time (e.g., weeks, months, or the like) until a sufficient amount of historical data for the individual has been collected. Such lack of initial data access may result in processing delays and/or inefficiencies in the generation of customized product outputs.

SUMMARY

Aspects of the disclosure provide effective, efficient, scalable, and convenient technical solutions that address and overcome the technical problems associated with data security and product output generation. In accordance with one or more arrangements discussed herein, a computing platform having at least one processor, a communication interface, and memory may receive encrypted data corresponding to a travel history. The computing platform may decrypt a portion of the encrypted data, resulting in first decrypted travel history data. Based on the first decrypted travel history data, the computing platform may send one or more commands directing a user device of a user corresponding to the travel history to display a graphical user interface that includes one or more insights based on the first decrypted travel history data, along with a first option to continue decrypting a subsequent portion of the encrypted data corresponding to the travel history and a second option to delete the encrypted data and the first decrypted travel history data without decrypting a remainder of the encrypted data. After receiving a selection of the first option, the computing platform may decrypt the subsequent portion of the encrypted data. After determining that the encrypted data has been decrypted in its entirety, the computing platform may process the entirety of the decrypted data to generate a customized product output based on the entirety of the decrypted data. The computing platform may send, to the user device and the enterprise server, one or more commands directing display of the customized product output, which may cause one or more of the user device or an enterprise device to display the customized product output.

In one or more instances, the encrypted data may be received from one or more of: a user device or a third party data source. In one or more instances, the encrypted data may further include email data.

In one or more instances, the computing platform may monitor an application on the user device to identify application data, where the application corresponds to an enterprise organization corresponding to the enterprise server. The computing platform may compare the identified application data to a predetermined product generation threshold. In response to determining that the identified application data exceeds the predetermined product generation threshold, the computing platform may 1) determine an initial product output, and 2) send one or more commands directing the user device to display the initial product output, wherein sending the one or more commands causes the user device to display the initial product output. In response to determining that the identified application does not exceed the predetermined product generation threshold, the computing platform may continue to monitor the application until the identified application data exceeds the predetermined product generation threshold.

In one or more instances, the initial product output may be a first quote and the customized product output may be a second quote, and the customized product output may be lower than the initial product output. In one or more instances, the computing platform may send, to the user device, one or more commands directing display of an additional product recommendation, which may cause one or more of the user device or an enterprise device to display the additional product recommendation and an option to maintain access to the decrypted data for determination of a second customized product output.

In one or more instances, the customized product output may be a quote for vehicle insurance, the additional product recommendation may be an indication that a quote for life insurance may be provided, and the second customized product output may be a quote for life insurance. In one or more instances, the encrypted data may include one or more of: a user identifier, an upload time, a date range, a number of trips, a total number of miles, an average trip length, a number of miles travelled at night, a number of highway miles travelled, a percentage of trips during which a speed limit was exceeded, a percentage of trips during which a difference between a speed and the speed limit exceeded one or more thresholds, a timestamp and weather data when the difference between the speed and the speed limit exceeded one or more thresholds, a number of miles biked, a number of miles walked, a number of trips taken using a rideshare application, a number of miles driven using a rideshare application, an average length of a rideshare trip, a number of driving miles, locations travelled to more than a predetermined number of times, landmarks within a predetermined distance of the locations, establishments within a predetermined distance of the locations, addresses of the establishments, an amount of time spent driving on trips shorter than a predetermined threshold distance, a total distance travelled on trips shorter than the predetermined threshold distance, an amount of time spent driving on trips longer than the predetermined threshold distance, a total distance travelled on trips longer than the predetermined threshold distance, an amount of time spent driving within a zip code, or an amount of miles driven within the zip code. In one or more instances, the processing may be performed using a processing engine uploaded by an enterprise server corresponding to the customized product output and without granting the enterprise server access to the encrypted data or the entirety of the decrypted data.

In accordance with one or more arrangements discussed herein, a computing device having at least one processor, a communication interface, and memory may generate an initial product output based on data stored at the computing device. The computing device may display a graphical user interface indicating the initial product output. The computing device may receive authorization indicating that third party data comprising historical travel data for a user of the computing device may be used to determine an updated product output. The computing device may display one or more graphical user interfaces that include the third party data, where each of the one or more graphical user interfaces includes a first option to maintain the authorization to use the third party data for generation of the updated product output and a second option to deny the authorization to use the third party data for generation of the updated product output. Based on receipt of the first option on each of the one or more graphical user interfaces, the computing device may generate, without granting an enterprise organization corresponding to the updated product output access to the third party data, the updated product output. The computing device may display a graphical user interface that includes the updated product output.

In accordance with one or more arrangements discussed herein, a computing platform having at least one processor, a communication interface, and memory may receive, from a user device, authorization to access third party data corresponding to a user of the user device, where the computing platform is an enterprise server. Based on the authorization, the computing platform may access the third party data. Based on the third party data, the computing platform may send one or more commands directing the user device to display one or more sequential graphical user interfaces that each include a portion of the third party data, along with a first option to maintain the authorization and a second option to revoke the authorization. After receiving a final authorization to use the third party data to generate a customized product output, the computing platform may generate the customized product output using the third party data. The computing platform may send one or more commands directing the user device to display the customized product output using the third party data, wherein sending the one or more commands directing the user device to display the customized product output causes the user device to display the customized product output and causes the enterprise server to delete the third party data.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2D depict an illustrative event sequence for implementing secure data sharing techniques for customized output generation in accordance with one or more example arrangements discussed herein;

FIGS. 5-11 depict illustrative user interfaces for implementing secure data sharing techniques for customized output generation in accordance with one or more example arrangements discussed herein.

DETAILED DESCRIPTION

Figure 1A:
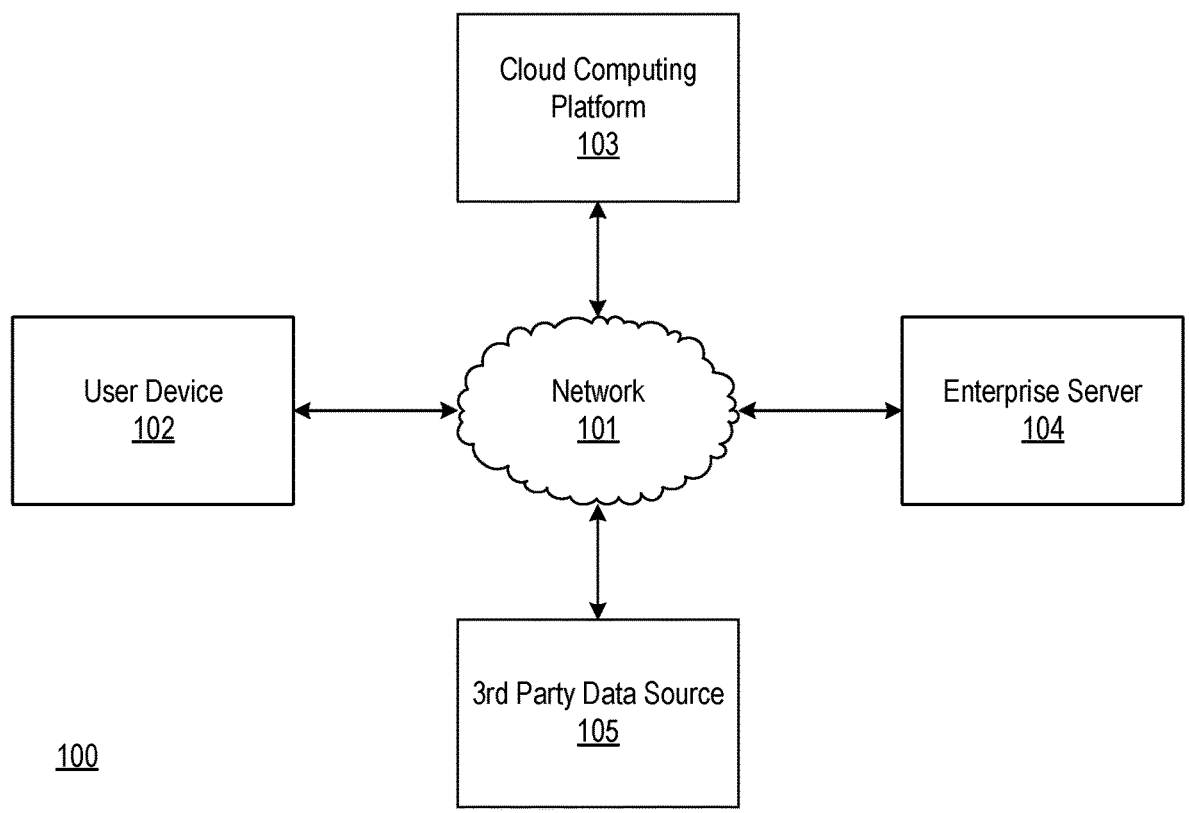
FIGS. 1A-1B depict an illustrative computing environment for implementing secure data sharing techniques for customized output generation in accordance with one or more example arrangements discussed herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief summary, the present disclosure provides systems and methods for leveraging secure data sharing techniques for customized output generation. In short, a computing platform may allow users to share data captured by a user's mobile device (e.g., location history data, etc.) and may allow the user to control what data is shared or not shared. In some examples, the system may include a stop sharing feature, which may allow a user to conduct what information is shared or provided to enterprise organizations (e.g., for further analysis, insight generation, etc.). In some arrangements, the captured data may be forwarded to a private data room in which a consumer may control what data is shared and not shared. The consumer may encrypt the data on their device and only share data with trusted organizations. In another example, the data may be shared to an independent cloud computing platform in which a consumer may provide access to trusted parties for all or a portion of the data captured for, in some instances, a predetermined or otherwise limited time period. In doing so, one or more of the systems and methods described herein may encourage the sharing of third party data, which may be useful in the generation of customized outputs (e.g., insurance quotes, or the like). In some instances, there may be privacy concerns associated with the sharing of such data. By allowing the data to be shared in a secure manner (e.g., where the data is not accessible by an output generation entity such as an insurance company, encrypted, deleted upon output generation, or the like), the advantages of such data may be realized in the output generation process while limiting privacy concerns. Furthermore, by using the third party data, accuracy of customized user outputs (e.g., insurance quotes, or the like) may be increased due to the introduction of additional data into the analysis/output generation process. As an additional technical advantage, by sharing third party data that has previously been collected, the process of data collection for use in output generation might not merely begin once the decision to generate an output has been made (e.g., which may result in a waiting period during which data is collected before an output may be generated). Rather, a dataset may be available for use in output generation immediately upon making the decision to generate an output. Accordingly, one or more of the systems and methods described herein may improve efficiency and reduce processing delays associated with output generation.

Figure 1B:
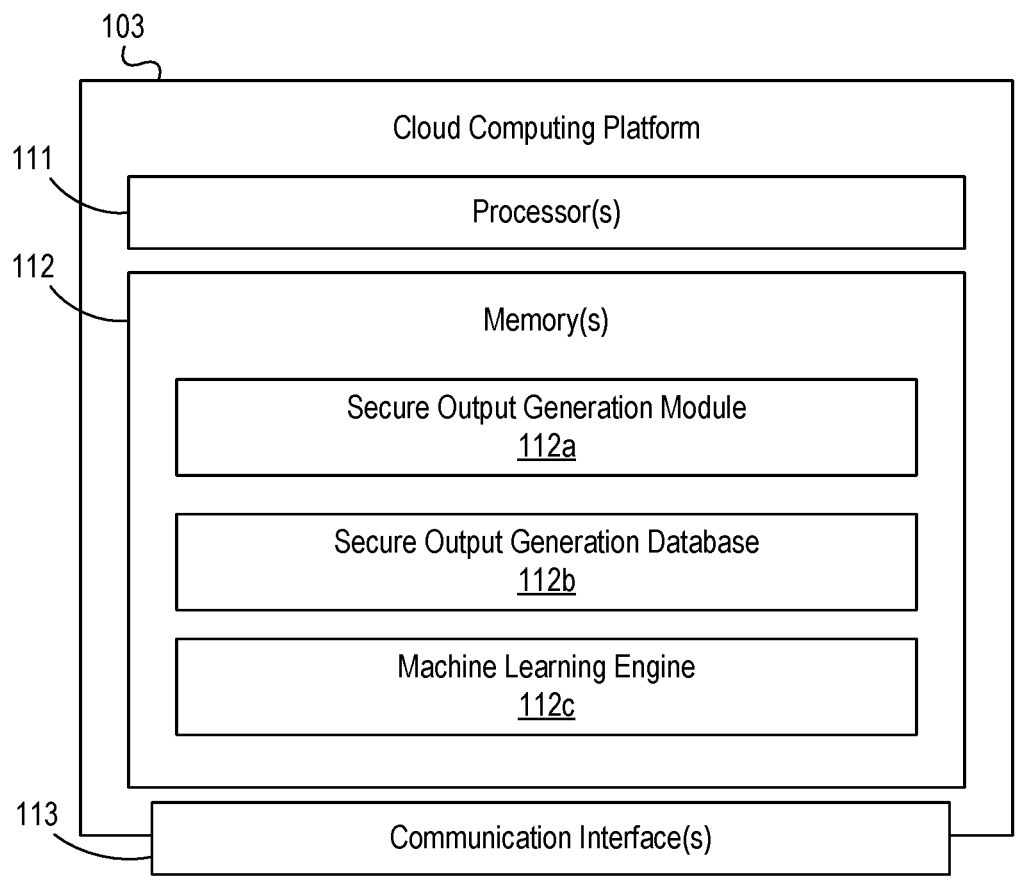

FIGS. 1A and 1B depict an illustrative computing environment for implementing secure data sharing techniques for customized output generation in accordance with one or more example embodiments. Referring to FIG. 1A, computing environment 100 may include one or more computer systems. For example, computing environment 100 may include user device 102, cloud computing platform 103, enterprise server 104, and third party data source 105.

User device 102 may be a computing device (e.g., a smart phone, a tablet, or the like) that may be used (e.g., by a customer of an enterprise organization such as an insurance company) to collect data (e.g., global positioning system (GPS) data, telematics data, or the like corresponding to trips (driving, rideshare, train, plane, biking, walking, or the like), email data, or the like. In some instances, user device 102 might not necessarily be usable exclusively by a customer of an insurance company. Rather, user device 102 may be configured for use by a variety of users. In one or more instances, the user device 102 may be a computing device configured to receive information (e.g., from the cloud computing platform 103, enterprise server 104, third party data source 105, or the like) and to generate/display graphical user interfaces (e.g., mobility display interfaces, customized output interfaces, or the like) accordingly. In some instances, user device 102 may be configured to locally generate customized outputs (e.g., as described below with regard to cloud computing platform 103).

As illustrated in greater detail below, cloud computing platform 103 may include one or more computing devices configured to perform one or more of the functions described herein. For example, cloud computing platform 103 may include one or more computers (e.g., servers, server blades, or the like). In one or more instances, cloud computing platform 103 may be configured to decrypt encrypted third party source data, maintain an enterprise processing engine, or otherwise take measures to perform secure analysis and customized output generation using data corresponding to the user device 102 without providing an enterprise organization without access to the third party source data. For example, in some instances, the cloud computing platform 103 may operate independently and might not be maintained or otherwise controlled by an enterprise organization corresponding to the enterprise server 104. In some instances, the cloud computing platform 103 may be configured to maintain one or more machine learning models and/or to perform machine learning techniques to analyze data from user device 102, third party data source 105, or the like to generate a customized product output (e.g., an insurance rate, quote, discount, premium, or the like). In one or more instances, the cloud computing platform 103 may be secured or otherwise walled off from enterprise server 104 so that processing, customized output generation, or the like may be performed without allowing the enterprise server 104 to access input data (e.g., provided by the user device 102, third party data source 105, or the like).

Enterprise server 104 may be one or more computing devices (e.g., servers, server blades, or the like) that may be maintained by an enterprise organization (e.g., an insurance agency, or the like). In some instances, the enterprise server 104 may be configured to perform customized output generation (e.g., as described above with regard to cloud computing platform 103). In other instances, the enterprise server 104 may be prevented from accessing data (e.g., from user device 102, cloud computing platform 103, third party data source 105, or the like) for enhanced data privacy purposes, and may be configured to receive a customized output from the cloud computing platform 103, user device 102, or the like. In some instances, enterprise server 104 may be configured to communicate with one or more enterprise user devices, which may be used, e.g., by a representative of an organization such as an insurance company) to perform various client services such as providing rates, quotes, discounts, or the like. In some instances, the enterprise server 104 may be configured to generate a customized product output (e.g., as described above with regard to the cloud computing platform 103) and then to delete data used in generation of the customized product output upon completion (e.g., for enhanced data privacy).

Third party data source 105 may be a computing device (e.g., server, server blade, or the like) configured to store data (e.g., mobility data, email data, or the like) collected at the user device 102. In some instances, the third party data source 105 may be configured to send data to the user device 102, the cloud computing platform 103, the enterprise server 104, or the like for customized output generation. In some instances, the network 101 may be configured to prevent or otherwise restrict access to the third party data source 105 for one or more devices included in the network 101 (e.g., enterprise server 104, cloud computing platform 103, or the like). In some instances, third party data source 105 may be maintained by a different enterprise organization than is maintaining the enterprise server 104. For example, the third party data source 105 may be maintained by an enterprise organization affiliated with a mapping application, email application, weather application (or other weather data source), and/or other applications that monitor historical user data.

Computing environment 100 also may include one or more networks, which may interconnect one or more of user device 102, cloud computing platform 103, enterprise server 104, third party data source 105, or the like. For example, computing environment 100 may include a network 101 (which may, e.g., interconnect user device 102, cloud computing platform 103, enterprise server 104, third party data source 105, or the like).

In one or more arrangements, user device 102, cloud computing platform 103, enterprise server 104, third party data source 105, and/or the other systems included in computing environment 100 may be any type of computing device capable of and configured for receiving a user interface, receiving input using the user interface, and communicating the received input to one or more other computing devices. For example, user device 102, cloud computing platform 103, enterprise server 104, third party data source 105, and/or the other systems included in computing environment 100 may, in some instances, be and/or include server computers, desktop computers, laptop computers, tablet computers, smart phones, sensors, or the like that may include one or more processors, memories, communication interfaces, storage devices, and/or other components. As noted above, and as illustrated in greater detail below, any and/or all of user device 102, cloud computing platform 103, enterprise server 104, third party data source 105, or the like may, in some instances, be special-purpose computing devices configured to perform specific functions.

Referring to FIG. 1B, cloud computing platform 103 may include one or more processors 111, memory 112, and communication interface 113. A data bus may interconnect processor 111, memory 112, and communication interface 113. Communication interface 113 may be a network interface configured to support communication between cloud computing platform 103 and one or more networks (e.g., network 101, or the like). Memory 112 may include one or more program modules having instructions that when executed by processor 111 cause cloud computing platform 103 to perform one or more functions described herein and/or one or more databases that may store and/or otherwise maintain information which may be used by such program modules and/or processor 111. In some instances, the one or more program modules and/or databases may be stored by and/or maintained in different memory units of cloud computing platform 103 and/or by different computing devices that may form and/or otherwise make up cloud computing platform 103. For example, memory 112 may have, store, and/or include secure output generation module 112a, a secure output generation database 112b, and a machine learning engine 112c. Secure output generation module 112a may have instructions that direct and/or cause cloud computing platform 103 to execute advanced machine learning techniques for generating customized outputs, as discussed in greater detail below. Secure output generation database 112b may store information used by secure output generation module 112a and/or cloud computing platform 103 in generating customized outputs and/or in performing other functions. Machine learning engine 112c may have instructions that direct and/or cause the cloud computing platform 103 to generate customized outputs, and to set, define, and/or iteratively refine optimization rules and/or other parameters used by the cloud computing platform 103 and/or other systems in computing environment 100.

Figure 2A:
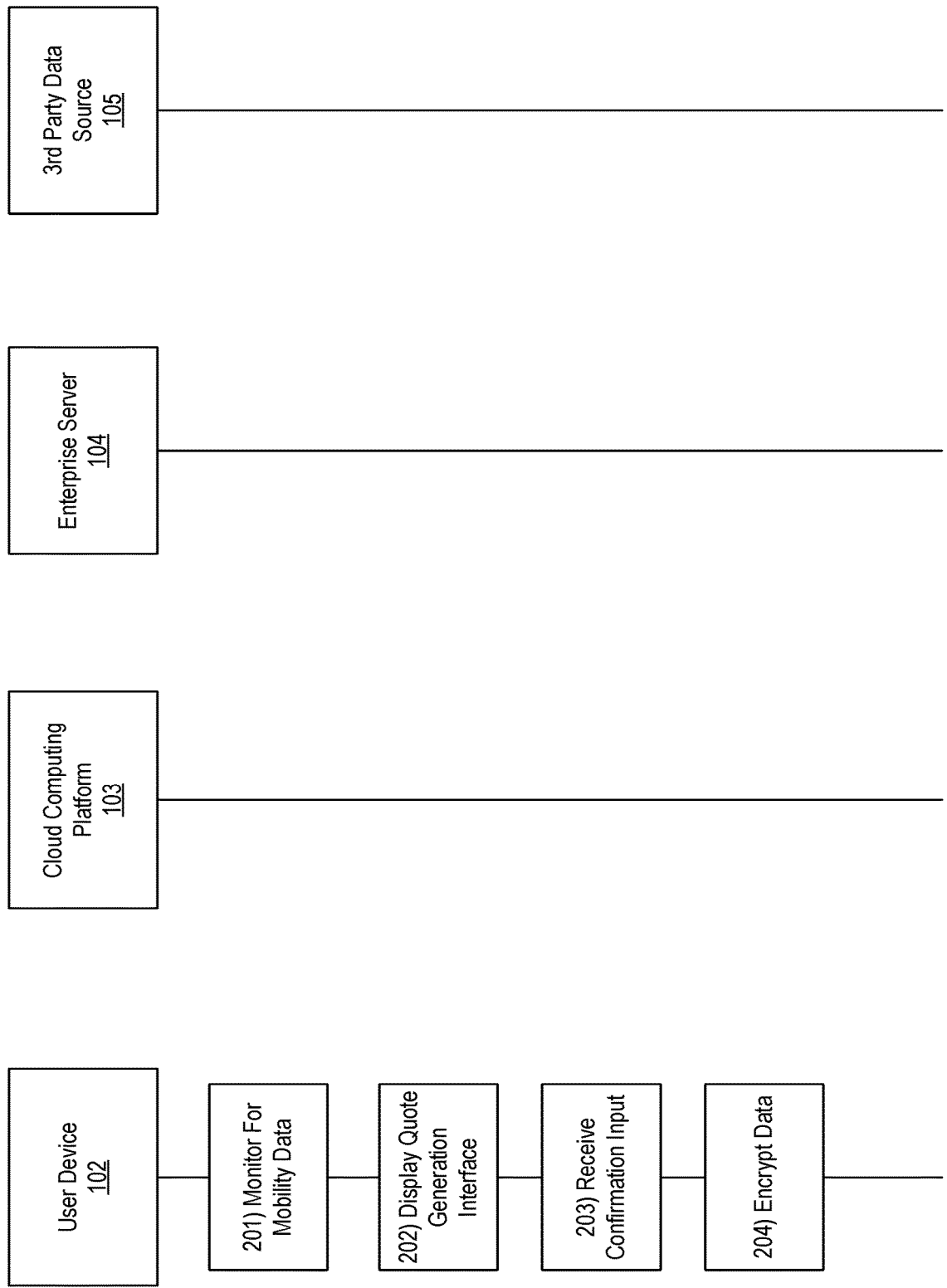

FIGS. 2A-2D depict an illustrative event sequence for implementing secure data sharing techniques for customized output generation in accordance with one or more example embodiments. Referring to FIG. 2A, at step 201, the user device 102 may monitor for locally stored mobility data. For example, the user device 102 may monitor local storage to identify mobility data (e.g., GPS data, telematics data, or the like) or other historical data that has been previously collected by the user device 102. In some instances, the user device 102 may monitor storage corresponding to a particular application (e.g., an application corresponding to an enterprise organization, such as an insurance institution, or the like). In some instances, the user device 102 may identify collection times corresponding to the mobility data, and may identify a time and/or date range that corresponds to the local mobility data. In some instances, after identifying the locally stored mobility data, the user device 102 may identify whether or not the local mobility data is sufficient for generation of an initial product output. For example, the user device 102 may aggregate the local mobility data and compare the aggregated local mobility data to one or more predetermined thresholds (e.g., does a file size of the local mobility data exceed a predetermined size threshold, does the data collection window exceed a predetermined time threshold, or the like). In one or more instances, the user device 102 may identify the one or more predetermined thresholds based on a minimum amount of mobility data needed to generate a generic customized product output (e.g., a basic/generalized insurance quote, or the like), which may, in some instances, be identified based on historical data patterns and/or by applying one or more machine learning techniques. If the user device 102 determines that information corresponding to the aggregated local mobility data does exceed the one or more predetermined thresholds, the user device 102 may proceed to step 202.

If the user device 102 determines that the information corresponding to the aggregated local mobility data does not exceed the one or more predetermined thresholds, the user device 102 may continue to monitor for local mobility data until enough has been collected to exceed the one or more predetermined thresholds, and may then proceed to step 202 after determining that the information corresponding to the aggregated local mobility data does exceed the one or more predetermined thresholds. In some instances, if the user device 102 determines that the information corresponding to the aggregated local mobility data does not exceed the one or more predetermined thresholds, the user device 102 may generate alternative product outputs (e.g., identity protection products, life insurance products, home insurance products, or the like).

In doing so, the user device 102 may effectively prequalify the user for a customized product offering by determining how much data is locally stored. Accordingly, the user device 102 and/or other devices involved in customized product output generation may conserve processing resources (e.g., at the user device 102, the cloud computing platform, the enterprise server 104, or the like) by avoiding generation of customized product outputs when insufficient data is available. Similarly, this may conserve the user's time (e.g., by not stringing the user along when available data is insufficient to generate a customized product output).

At step 202, in response to determining that the aggregated local mobility data does exceed the one or more predetermined thresholds, the user device 102 may display an initial product output, a quote generation interface, a basic/generalized quote interface, or the like. For example, the user device 102 may display a graphical user interface similar to graphical user interface 505, which is shown in FIG. 5. In these instances, the user device 102 may display indications that a user of the user device 102 is a customer of a particular organization, and may qualify for a lower price as a result. Additionally or alternatively, the user device 102 may apply one or more machine learning algorithms to identify a generalized quote for the user (e.g., based on the local mobility data). For example, the user device 102 may generate a quote for the user using only the mobility data stored at the user device 102. In some instances, the user device 102 may display a percentage of individuals who saved money by allowing access to third party data, and a percentage or average amount of money that those individuals saved. In some instances, rather than recommending that the user provide access to third party data, the user may self-select into a process of sharing third party data for purposes of obtaining a quote. In these instances, the user device 102 might not generate an initial quote based on local mobility data (e.g., the user device 102 may simply proceed to generate a customized product output).

At step 203, the user device 102 may receive a user input indicating whether or not the user would like to learn more about sharing third party data, granting access to third party data, denying access to third party data, or the like. If the user device 102 receives an input indicating that third party data should not be shared, the user device 102 may return to step 201, and continue to monitor for local mobility data and, in some instances, prompt the user to enroll in third party data sharing at a later time (e.g., 6 months later, or the like). If the user device 102 receives an input indicating that third party data may be shared (or does not receive an input indicating that the third party data may not be shared), the user device 102 may proceed to step 204. In some instances, at step 203, the user device 102 may display an informational interface, similar to graphical user interface 605 (which is shown in FIG. 6) indicating that third party data may be linked, shared, or the like to see if the user qualifies for a lower price (e.g., a lower insurance price, or the like). Additionally or alternatively, the user device 102 may indicate that the third party data will not be saved. Additionally or alternatively, the user device 102 may indicate that the user's mobility patterns will be analyzed based on the third party data to determine a comprehensive quote (e.g., which will be equal or lower than the quote displayed at step 202). Additionally or alternatively, the user device 102 may indicate that the user may bail out of the third party data share process at any time by selection of a user interface element (e.g., a "cancel"/"get me out of here" button, or the like). In doing so, the user device may confidentially link mobility or travel data from third party organizations to see if an individual qualifies for a lower price. In some instances, the user device 102 may display the user interfaces within an application corresponding to an enterprise organization (e.g., an insurance institution, or the like).

Figures 7, 8:
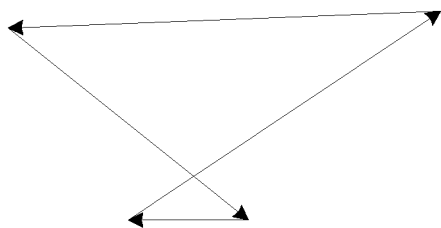

In some instances, if the user device 102 receives an input indicating that the third party data may be shared, the user device 102 may display a graphical user interface similar to graphical user interface 705, which is shown in FIG. 7. For example, the user device 102 may prompt the user to select types of data (e.g., affiliated with a particular third party organization) for which access may granted (e.g., location history, email, maps, or the like). In some instances, the user device 102 may include the "get me out of here" or "cancel" button (e.g., as described above with regard to the graphical user interface 605). In response to selection of the "get me out of here" button, the user device 102 may determine that access to the third party source data should not be granted at this time, cause any third party source data already provided to be deleted (e.g., by sending delete commands to the cloud computing platform 103, or the like), and may return to step 201. In some instances, by engaging in this step by step process of progressing through user interfaces while constantly giving the user an option to exit the process of granting access to his or her third party data, the user device 102 may allow users to feel more comfortable and secure about granting third party data access by knowing that they may always bail out without any further data being shared and having any data already provided deleted, retracted, or the like.

In some instances, in addition or as an alternative to the user device 102 monitoring itself for mobility data, the cloud computing platform 103 may monitor the application and/or the user device 102 for the mobility data. In these instances, the cloud computing platform 103 may compare the mobility data to one or more predetermined thresholds as described above with regard to the user device 102 at step 201 and, in response to determining that the aggregated mobility data does exceed the one or more predetermined thresholds, the cloud computing platform 103 may determine the initial product output (and send one or more commands directing the user device 102 to display the initial product output). In response to determining that the aggregated mobility data does not exceed the one or more predetermined thresholds, the cloud computing platform 103 may continue to monitor the application and/or the user device 102 for mobility data until the one or more predetermined thresholds are exceeded. Accordingly, the methods described above in steps 201-203 may be performed by the cloud computing platform 103 and/or a combination of the cloud computing platform 103 and the user device 102 without departing from the scope of the disclosure.

At step 204, the user device 102 may encrypt third party data. In some instances, the user device 102 may request the third party data from a third party data source (e.g., third party data source 105), receive the third party data, and encrypt the third party data. In other instances, the user device 102 may request that the third party data be sent from the third party data source 105 to the cloud computing platform 103, enterprise server 104, or the like. In these instances, the third party data source 105 may encrypt the third party data.

In some instances, in encrypting the third party data, the user device 102 may encrypt historical travel data such as raw data (e.g., telematics data, GPS data, or the like), derivative data (a number of trips, a total number of miles, an average trip length, a number of miles travelled at night, a number of highway miles travelled, a percentage of trips during which a speed limit was exceeded, a percentage of trips during which a difference between a speed and the speed limit exceeded one or more thresholds, a timestamp and weather data when the difference between the speed and the speed limit exceeded one or more thresholds, a number of miles biked, a number of miles walked, a number of trips taken using a rideshare application, a number of miles driven using a rideshare application, an average length of a rideshare trip, a number of driving miles, locations travelled to more than a predetermined number of times, landmarks within a predetermined distance of the locations, establishments within a predetermined distance of the locations, addresses of the establishments, an amount of time spent driving on trips shorter than a predetermined threshold distance, a total distance travelled on trips shorter than the predetermined threshold distance, an amount of time spent driving on trips longer than the predetermined threshold distance, a total distance travelled on trips longer than the predetermined threshold distance, an amount of time spent driving within a zip code, or an amount of miles driven within the zip code, a number of miles travelled on a train, a number of miles travelled on a plane, or the like), or the like for the user to third party source data of other users. In these instances, the user device 102 may determine this derivative data using one or more machine learning algorithms, one or more machine learning datasets, or the like based on raw data included in the third party source data. In some instances, when computing derivative data for the user, the user device 102 may distinguish between instances where the user is a driver in a vehicle and instances where the user is a passenger in the vehicle (e.g., using one or more machine learning algorithms and datasets to compare detected driving patterns, signatures, or the like to historical driving patterns, signatures, or the like for the user). In other instances, the derivative data may be included in the third party source data (e.g., received from the third party data source 105, or the like). Additionally or alternatively, the user device 102 may encrypt email data, other messaging data, or the like. In some instances, the user device 102 may encrypt data corresponding to a user account of the user for a third party enterprise.

In some instances, the user device 102 may encrypt the third party data using identity based encryption, pass key encryption, homomorphic encryption, or the like. In doing so, the user device 102 may prevent an enterprise organization (e.g., an insurance institution, or the like) from accessing the third party source data unless and/or until a decryption key is provided, or the third party source data is otherwise decrypted.

Figure 2B:
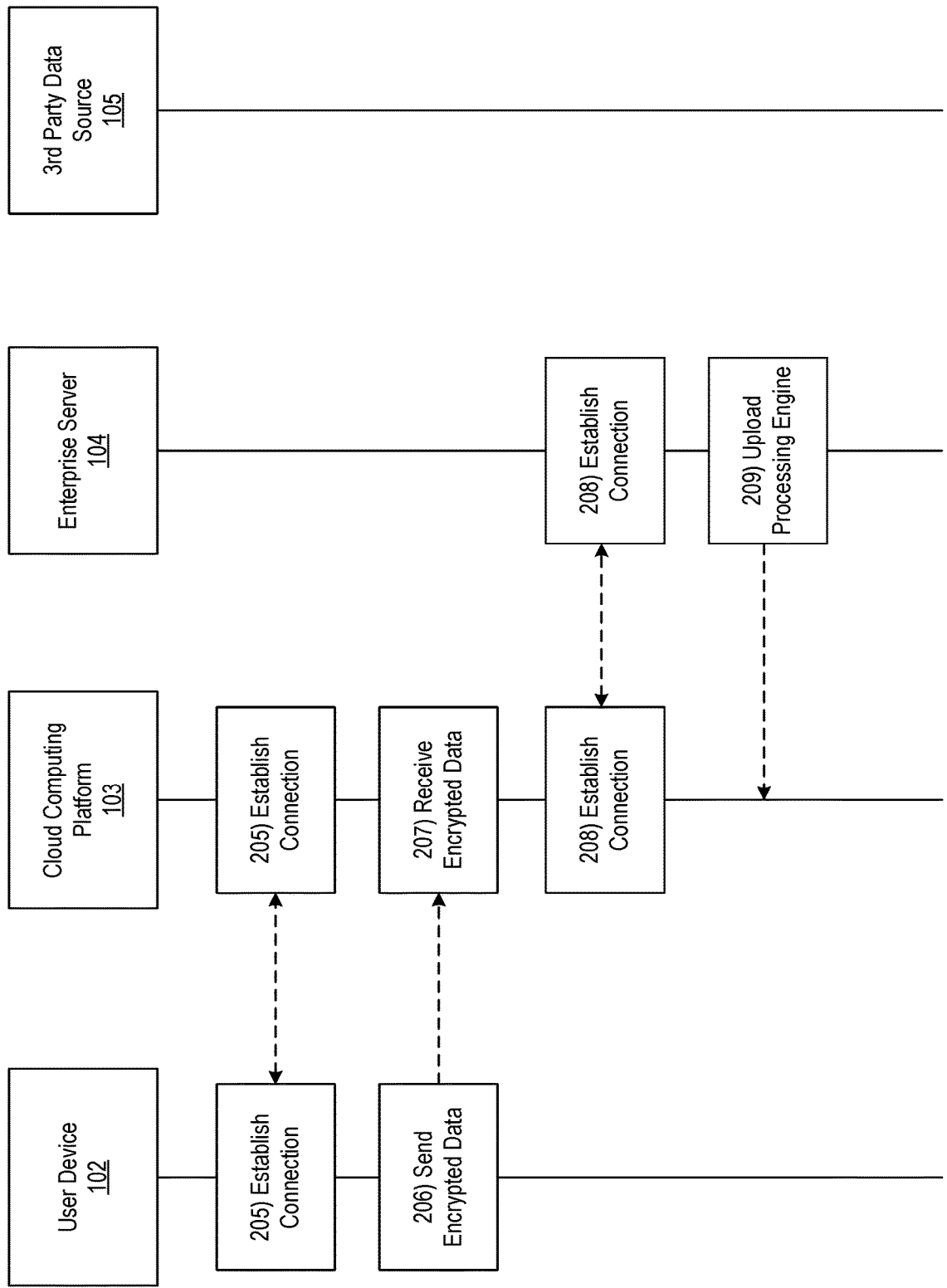

Referring to FIG. 2B, at step 205, the user device 102 may establish a connection with cloud computing platform 103. In one or more instances, the user device 102 may establish a first wireless data connection with cloud computing platform 103 to link the user device 102 to the cloud computing platform 103 (e.g., in anticipation of sending the encrypted data). In some instances, the user device 102 may identify whether a connection is already established with the cloud computing platform 103. If a connection is already established with the cloud computing platform 103, the user device 102 might not re-establish the connection. If a connection is not yet established with the cloud computing platform 103, the user device 102 may establish the first wireless data connection as described herein.

At step 206, the user device 102 may send the encrypted data (e.g., the third party source data encrypted at step 204) to the cloud computing platform 103. In some instances, the user device 102 may send the encrypted data to the cloud computing platform 103 while the first wireless data connection is established.

At step 207, the cloud computing platform 103 may receive the encrypted data from the user device 102. In some instances, the cloud computing platform 103 may receive the encrypted data from the user device 102 while the first wireless data connection is established and via the communication interface 113.

At step 208, enterprise server 104 may establish a connection with the cloud computing platform 103. For example, the enterprise server 104 may establish a second wireless data connection with the cloud computing platform 103 to link the enterprise server 104 to the cloud computing platform 103 (e.g., in anticipating of uploading an enterprise processing engine). In one or more instances, the enterprise server 104 may identify whether or not a connection is already established with the cloud computing platform 103. If the enterprise server 104 has already established a connection with the cloud computing platform 103, the enterprise server 104 might not re-establish the connection. If the enterprise server 104 has not yet established a connection with the cloud computing platform 103, the enterprise server 104 may establish the second wireless data connection as described herein.

At step 209, the enterprise server 104 may upload an enterprise processing engine to the cloud computing platform 103. For example, the enterprise server 104 may upload the enterprise processing engine while the second wireless data connection is established. In some instances, in uploading the enterprise processing engine, the enterprise server 104 may upload a processing engine that may be used to process third party source data (e.g., historical travel data, email data, or the like) to generate a customized product output (e.g., an auto insurance quote, rate, discount, premium, or the like). For example, the enterprise server 104 may upload a processing engine configured with one or more machine learning datasets that may be used to compare third party source data corresponding to the user to third party source data of other individuals (e.g., other individuals who have granted permission for their third party source data to be accessed). In some instances, the enterprise server 104 may upload a processing engine that may be used to generate customized product outputs based on third party source data, but that may be otherwise inaccessible to the enterprise server 104 following the upload. For example, third party source data processed by the cloud computing platform 103 using the enterprise processing engine may be secured or otherwise protected from access by the enterprise server 104. In doing so, the cloud computing platform 103 may leverage resources of the enterprise organization (e.g., an insurance institution) to generate customized product outputs while protecting user privacy by secluding and protecting their corresponding third party source data from access by the enterprise organization. Furthermore, this may allow the enterprise organization to utilize a wealth of additional data (e.g., as collected and maintained by third party sources) to compute customized product outputs, while minimizing security/privacy risks to the user.

Figure 2C:
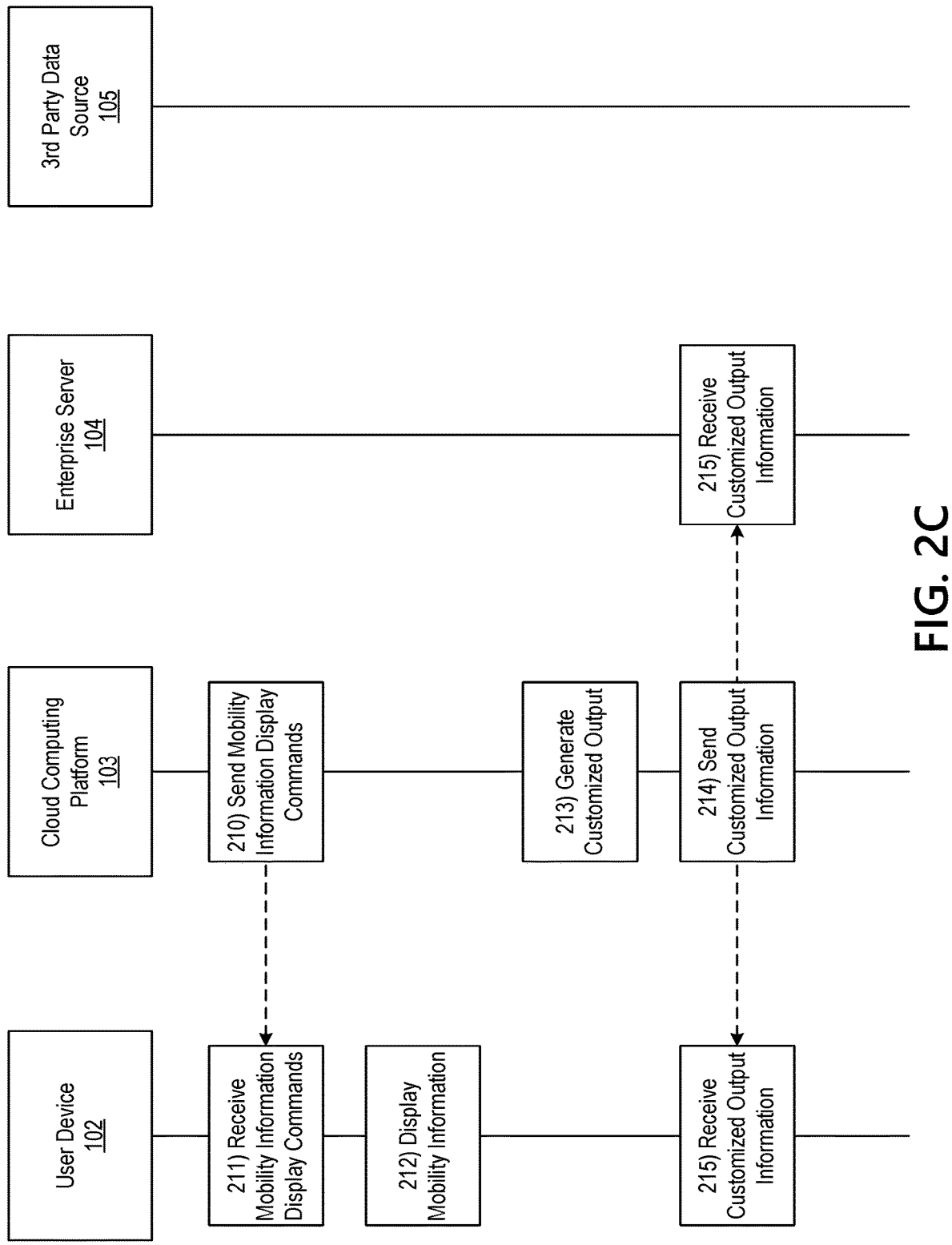

Referring to FIG. 2C, at step 210, the cloud computing platform 103 may generate and send one or more mobility information display commands to the user device 102. In some instances, the cloud computing platform 103 may send the one or more mobility information display commands to the user device 102 while the first wireless data connection is established and via the communication interface 113.

With regard to generation of the one or more mobility information display commands, the cloud computing platform 103 may use the processing engine, uploaded at step 209, to generate one or more mobility insights (e.g., a typical mobility pattern on a map, a comparison of annual miles driven to an average number of annual number of miles driven, a comparison of a percentage of miles travelled that are highway miles to an average percentage of miles travelled that are highway miles, a most common route travelled, a mileage of the most common route, a number of times per week that the most common route is travelled, a number of times the speed limit is exceeded under poor or unsafe driving conditions (e.g., rain, snow, or the like), or the like), based on the third party source data, and may direct the user device 102 to display one or more graphical user interfaces that include the mobility insights. In some instances, the cloud computing platform 103 may generate the one or more mobility insights without granting the enterprise organization access to the third party source data. Rather, the cloud computing platform 103 may effectively host a private data room that may be used to analyze the third party source data using tools provided by the enterprise organization (e.g., the processing engine). In some instances, the cloud computing platform 103 may compare the third party source data corresponding to the user to third party source data corresponding to other users (e.g., to compare the user to an average, or the like). In these instances, the cloud computing platform 103 may have previously been granted access to the third party source data corresponding to the other users, and may maintain a privacy wall or otherwise continuously prevent access of this other third party source data to the enterprise server 104. In doing so, the cloud computing platform 103 may apply data processing capabilities of the enterprise server 104, while granting the user privacy of their corresponding third party source data (e.g., by preventing the enterprise server 104 from accessing the third party source data). Similarly, the cloud computing platform 103 may leverage third party source data corresponding to other users for data comparison and insight generation, while preventing access by the enterprise server 104 to the third party source data corresponding to these other users (e.g., this data may be maintained at the cloud computing platform 103 or otherwise incorporated into the processing engine without being provided to the enterprise server 104).

At step 211, the user device 102 may receive the one or more mobility information display commands sent at step 210. In some instances, the user device 102 may receive the one or more mobility information display commands while the first wireless data connection is established.

At step 212, the user device 102 may cause display of one or more mobility insight interfaces. In some instances, the user device 102 may cause display of the one or more mobility insight interfaces based on, after, and/or in response to receiving the one or more mobility information display commands at step 211. In some instances, in displaying the one or more mobility insight interfaces, the user device 102 may display the mobility insights generated at step 210. In some instances, in displaying the one or more mobility insight interfaces, the user device 102 may display a graphical user interface similar to graphical user interface 805, which is shown in FIG. 8. For example, the user device 102 may display a graphical user interface that includes mobility patterns for the user, such as a typical driving pattern for the user through a day (e.g., from home, to the gym, to work, to children's school, and home again, or the like). In these instances, the user device 102 may similarly display the "get me out of here button" as described above, and may cause any stored data to be deleted (e.g., by sending one or more delete commands to the cloud computing platform 103)/return to step 201 in response to selection of the button.

In some instances, in displaying the one or more mobility insight interfaces, the user device 102 may allow the user to step through a series of mobility insight interfaces, which may, in some instances, include a graphical user interface similar to graphical user interface 905, which is shown in FIG. 9. For example, the user device 102 may display a graphical user interface that shows a comparison of historical travel data for the user as compared to an average. In these instances, the user device 102 may provide the user with options to confirm the information (in which case the user device 102 may proceed to step 213) or to exit the process (e.g., using the "get me out of here" or "cancel" button), resulting in deletion of the third party source data as described above and a return to step 201.

In some instances, to progress through the one or more mobility insight interfaces, the user device 102 may communicate with the cloud computing platform 103 in a back and forth manner. For example, the user device 102 may receive acceptance to progress to a subsequent user interface, notify the cloud computing platform 103, and the cloud computing platform 103 may generate and send subsequent mobility information display commands (e.g., the user device 102 and the cloud computing platform 103 may repeat steps 210-212 until each of the one or more mobility insight interfaces have been displayed). In some instances, the user device 102 may receive user input indicating that one or more mobility insight interfaces should be bypassed and requesting that a customized product output be generated. In these instances, the user device 102 may proceed to step 213 without display of further mobility insight interfaces.

In instances where multiple mobility insight interfaces are being displayed, the cloud computing platform 103 may decrypt a portion of the encrypted data, received at step 207, that may be used to generate a first insight for a first interface (e.g., the daily trip summary illustrated in FIG. 8). In these instances, the cloud computing platform 103 might not decrypt a subsequent portion of the encrypted data (e.g., to generate the average comparisons illustrated in FIG. 9) until the user has progressed through the first interface without revoking authorization to access the third party source data. In these instances, the cloud computing platform 103 and the user device 102 may communicate in this manner, while decrypting the encrypted data in a piecemeal fashion until the encrypted data has been decrypted in its entirety (or at least sufficiently decrypted for purposes of generating the customized product output).

In some instances, each of the mobility insight interfaces may include a first option to maintain authorization for use of the third party source data in generation of the customized product output and second option to deny the authorization to use the third party source data for generation of the updated product output (e.g., the "get me out of here" or "cancel" button, or the like). In instances where the first option is selected, the cloud computing platform 103 may continue to prevent access from the enterprise organization, enterprise server 104, or the like to the third party source data.

By displaying the mobility insight interfaces, the user device 102 may demonstrate, to the user, a value of sharing the third party source data for customized output generation. For example, the user device 102 may illustrate derivative data that may be generated using the third party source data, which might otherwise not be available for use in generation of the customized product output.

At step 213, after confirmation to proceed through each of the one or more mobility insight interfaces has been received, the cloud computing platform 103 may analyze the third party source data corresponding to the user to generate a customized product output (e.g., an insurance quote, rate, discount, premium, or the like). For example, the cloud computing platform 103 may use the processing engine uploaded from the cloud computing platform 103 to apply one or more machine learning algorithms to the third party source data based on one or more machine learning datasets (e.g., corresponding to third party source data of other users). For example, the cloud computing platform 103 may compare raw data (e.g., telematics data, GPS data, or the like), derivative data (a number of trips, a total number of miles, an average trip length, a number of miles travelled at night, a number of highway miles travelled, a percentage of trips during which a speed limit was exceeded, a percentage of trips during which a different between a speed and the speed limit exceeded one or more thresholds, a number of miles biked, a number of miles walked, a number of trips taken using a rideshare application, a number of miles driven using a rideshare application, an average length of a rideshare trip, a number of driving miles, locations travelled to more than a predetermined number of times, landmarks within a predetermined distance of the locations, establishments within a predetermined distance of the locations, addresses of the establishments, an amount of time spent driving on trips shorter than a predetermined threshold distance, a total distance travelled on trips shorter than the predetermined threshold distance, an amount of time spent driving on trips longer than the predetermined threshold distance, a total distance travelled on trips longer than the predetermined threshold distance, an amount of time spent driving within a zip code, or an amount of miles driven within the zip code, a number of miles travelled on a train, a number of miles travelled on a plane, or the like), or the like for the user to third party source data of other users. In these instances, the cloud computing platform 103 may determine this derivative data using one or more machine learning algorithms, one or more machine learning datasets, or the like based on raw data included in the third party source data. In some instances, when computing derivative data for the user, the cloud computing platform 103 may distinguish between instances where the user is a driver in a vehicle and instances where the user is a passenger in the vehicle (e.g., using one or more machine learning algorithms and datasets to compare detected driving patterns, signatures, or the like to historical driving patterns, signatures, or the like for the user). In other instances, the derivative data may be included in the third party source data (e.g., determined by the user device 102 and/or the third party data source 105).

In some instances, the cloud computing platform 103 may set threshold values for various third party source data values, and may generate the customized product output based on a number of threshold values exceeded. For example, the cloud computing platform 103 may apply a 10% discount on the initial product output displayed at step 202 if no threshold values are exceeded, and may reduce the discount by 1% for each threshold exceeded, or the like. In some instances, the cloud computing platform 103 may weigh certain third party source data values more than others (e.g., if a threshold percentage of trips where the speed limit was exceeded by twenty or more miles per hour is exceeded, a 3% reduction may be applied to the discount, whereas if a threshold percentage of trips where the speed limit was exceeded by one to five miles an hour is exceeded, a 1% reduction may be applied to the discount) based on an impact that the various types of third party source data have on risk, safety, or the like. In some instances, the cloud computing platform 103 may dynamically tune the various thresholds based on results of the machine learning algorithms and/or the customized product outputs. For example, if less than 1% of users are actually receiving a customized product output lower than the initial product output, the cloud computing platform 103 may determine that the thresholds are too strict and should be raised. Similarly, if more than 90% of users are receiving a 10% discount from the initial product output, the cloud computing platform 103 may determine that the thresholds are too lenient and should be reduced.

As third party source data is collected for additional users and corresponding customized product outputs are generated, the cloud computing platform 103 may identify stored third party source data (corresponding to other users) that is within a predetermined threshold value of the third party source data (e.g., corresponding to the user). The cloud computing platform 103 may maintain a database of the customized product outputs for these other users, and may determine that if the similarities between mobility data (e.g., the third party source data) exceed a predetermined threshold (and/or that a threshold number of types of third party source data have similarity that exceeds the predetermined threshold), the cloud computing platform 103 may determine that the customized product output for the user should be the same as the customized product output previously generated for the other similarly situated user.

Additionally or alternatively, the cloud computing platform 103 may analyze message data (e.g., emails, or the like) using natural language processing algorithms, or the like, and may use the results to generate the customized product output. For example, the cloud computing platform 103 may use the processing engine to apply one or more machine learning algorithms to the outputs of the natural language processing algorithms to compute a risk level or score for the user based on the content of the messages (e.g., does the user communicate about risky activities, travelling at risky times, travelling to risky areas, or the like). If the cloud computing platform 103 determines that the risk score for the user exceeds a predetermined threshold, the computing platform might not apply a further discount to the initial product output. If the cloud computing platform 103 determines that the risk score for the user does not exceed the predetermined threshold, the computing platform may apply a further discount to the initial product output.

In generating the customized product output as described herein, the cloud computing platform 103 may generate an insurance quote that is less than or equal to the initial product output (e.g., which may also be an insurance quote). Further, in generating the customized product output as described herein, the cloud computing platform 103 might not grant the enterprise server 104 access to the third party source data, or may otherwise maintain a layer of privacy between the enterprise server 104 and the third party source data to prevent it being from being shared with the enterprise server 104.

At step 214, the cloud computing platform 103 may send information corresponding to the customized product output generated at step 213 to the user device 102 and the enterprise server 104. In some instances, the cloud computing platform 103 may send one or more commands directing the user device 102 and/or the enterprise server 104 to display or otherwise cause display (e.g., by directing another computing device to display) the customized product output. In some instances, the cloud computing platform 103 may send the information corresponding to the customized product output via the communication interface 113 and while the first and second wireless data connections are established.

In sending the information corresponding to the customized product output to the enterprise server 104, the cloud computing platform 103 may send the finalized customized product output and a user identified to the enterprise server 104 (e.g., so that the enterprise server 104 may notify employees of the enterprise organization or otherwise process the customized product output), but may continue to maintain privacy or otherwise prevent access between the enterprise organization and the third party source data.

At step 215, the user device 102 and the enterprise server 104 may receive the information corresponding to the customized product output sent at step 214. In some instances, the user device 102 and the enterprise server 104 may receive the information corresponding to the customized product output while the first and second wireless data connections are established. In some instances, the user device 102 and the enterprise server 104 may receive the one or more commands directing the user device 102 and/or the enterprise server 104 to display or otherwise cause display (e.g., by directing another computing device to display) of the customized product output.

Referring to FIG. 2D, at step 216, the user device 102 may display the customized product output. In some instances, the user device 102 may display the customized product output in response to or based on the one or more commands directing the user device 102 and/or the enterprise server 104 to display or otherwise cause display (e.g., by directing another computing device to display) of the customized product output. In some instances, in displaying the customized product output, the user device 102 may display a graphical user interface similar to graphical user interface 1005, which is shown in FIG. 10. For example, the user device 102 may display a quote along with options to purchase or exit (e.g., using the "get me out of here" or "cancel") button. If the user device 102 receives a user input corresponding to the "buy" element, the user device 102 may send a message, notification, or the like to the enterprise server 104 indicating that the purchase should be initiated at the identified price. In these instances, the enterprise server 104 may update one or more records, execute one or more transactions, or the like in response to the indication that the customized product output should be purchased. If the user device 102 receives a user input corresponding to the "get me out of here" or "cancel" element, the user device 102 may cause the cloud computing platform 103 to delete any previously processed or accessed third party source data corresponding to the user (e.g., based on one or more delete commands from the user device 102, or the like), and may return to step 201.

Similarly, the enterprise server 104 may cause one or more enterprise user devices to display a graphical user interface indicating the customized product output. In doing so, the enterprise server 104 may allow employees of the enterprise organization to log, process, or otherwise provide the customized product output.

At step 217, the cloud computing platform 103 may send one or more commands directing the user device 102 to display a product recommendation interface to the user device 102. In some instances, the cloud computing platform 103 may send the one or more commands directing the user device 102 to display the product recommendation interface while the first wireless data connection is established and via the communication interface 113.

At step 218, the user device 102 may receive the one or more commands directing the user device 102 to display a product recommendation interface. For example, the user device 102 may receive the one or more commands directing the user device 102 to display the product recommendation interface while the first wireless data connection is established.

Figure 11:
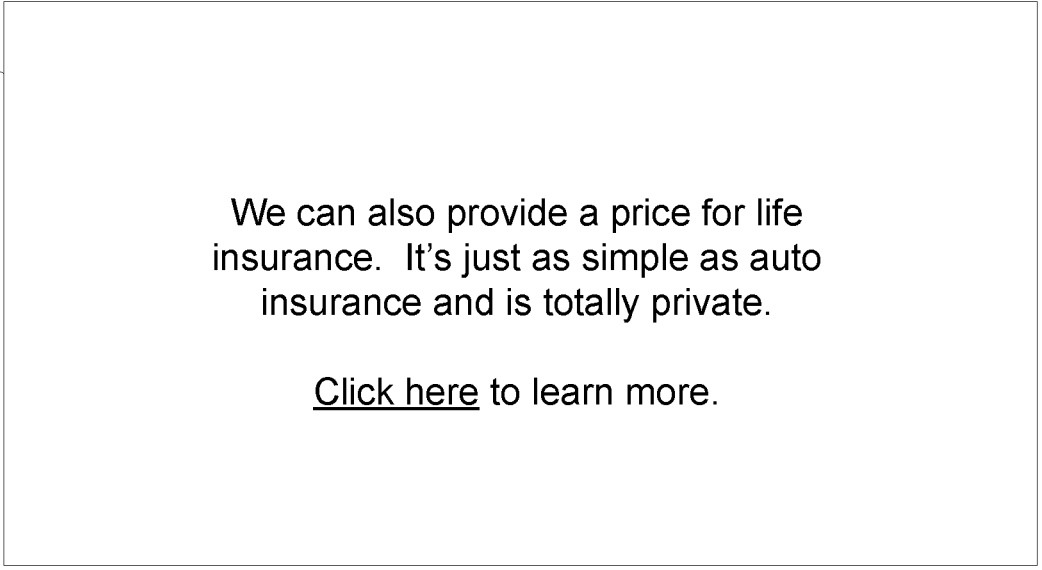

At step 219, the user device 102 may display the product recommendation interface. For example, the user device 102 may display the product recommendation interface based on and/or in response to the one or more commands directing the user device 102 to display the product recommendation interface. In some instances, the user device 102 may display a graphical user interface similar to graphical user interface 1105, which is shown in FIG. 11. For example, the user device 102 may have previously displayed a customized product output corresponding to a first product (e.g., auto insurance) and the user device 102 may now indicate that a customized product output corresponding to a second product (e.g., life insurance, home insurance, renters insurance, flood insurance, or the like) may be generated. If the user device 102 receives a user input indicating that the user would like to learn more about the second product, the user device 102 may walk through a series of user interfaces (similar to those described above with regard to the customized product output) for purposes of generating the customized product output corresponding to the second product (e.g., life insurance, or the like). In some instances, the same third party source data may be used to determine the customized product output corresponding to the second product as was used to determine the customized product output corresponding to the first product. In other instances, different third party source data may be used to determine the customized product output corresponding to the second product. In these instances, the user device 102 may cause the third party source data already stored to be deleted (e.g., using one or more delete commands) and may cause new third party source data (which may, in some instances, be affiliated with a different third party organization) to be provided as described above. If the user device 102 receives a user input indicating that the user would not like to learn more about the second product, the user device 102 may cause stored third party source data to be deleted (e.g., using one or more delete commands), and may return to step 201 (e.g., to probe the user at a later time regarding the second product). In some instances, the user device 102 may display the "get me out of here" or "cancel" button as part of the product recommendation interface.

In some instances, the user device 102, cloud computing platform 103, enterprise server 104, or the like may notify the user after expiration of a predetermined period of time (e.g., six months, one year, or the like), and may request updated third party source data for use in computing an updated/refreshed customized product output. In these instances, the user device 102, cloud computing platform 103, enterprise server 104, or the like may apply one or more techniques similar to those described above with regard to generation of the customized product output to generate the updated customized product output. In these instances, the user device 102, cloud computing platform 103, enterprise server 104, or the like may monitor for any lifestyle changes corresponding to the user (e.g., a new baby, a marriage, or the like) that may be relevant to the generation of the updated customized product output, and may apply these lifestyle changes in the generation of the updated customized product output.

It should be understood that the steps described in the illustrative event sequence may be performed in any order without departing from the scope of the disclosure. Furthermore, it should be understood that the above described techniques may be applied to several additional or alternative embodiments. For example, rather than uploading a processing engine to the cloud computing platform 103, the enterprise server 104 may send the processing engine directly to the user device 102 for local processing (e.g., if computing power, storage capacity, or the like are sufficient for processing). In this embodiment, because all processing is performed locally on the user device 102, third party source data need not be shared with the enterprise server 104 or the cloud computing platform 103, which may result in increased security. In some instances, the enterprise server 104 may send the processing engine to the cloud computing platform 103 in some instances and to the user device 102 in others based on an amount of processing power needed to generate a particular customized product output. For example, if an amount of data to be processed in performing the customized product output exceeds a predetermined threshold, the enterprise server 104 may send the processing engine to the cloud computing platform 103, which may have more processing power than the user device 102. However, if the amount of data to be processed in performing the customized product output does not exceed the predetermined threshold, the enterprise server 104 may send the processing engine to the user device 102 for local processing, which may be more secure than the cloud computing platform 103. In some instances, the processing may be distributed between cloud computing platform 103 and the user device 102.

As an additional and/or alternative embodiment, rather than sending the third party source data and uploading the processing engine to the cloud computing platform 103, the third party source data may be sent to the enterprise server 104 for processing. In these instances, the third party source data may be encrypted as described above, sent to the enterprise server 104, processed, and subsequently deleted once processing is complete (e.g., as described above with regard to the cloud computing platform 103). Accordingly, customized product outputs may be generated by the user device 102, the cloud computing platform 103, and/or the enterprise server 104 without departing from the scope of the disclosure.

Accordingly, by allowing for such secure data sharing for customized output generation, one or more of the systems and methods described herein may balance user privacy concerns with optimization of customized output generation. Furthermore, by allowing access to third party source data for customized output generation, one or more of the systems and methods described herein may expedite the process of customized output generation (e.g., rather than collecting telematics data, computing derivative data, or the like over a period of time after a customer enrolls, a large data set is available for processing immediately upon enrollment). In some instances, this may increase accuracy, while expediting the timeline (and thus increasing the efficiency), of customized output generation. Furthermore, by collecting and/or computing derivative data, the accuracy of customized output generation may be further improved by applying one or more machine learning algorithms and datasets to the derivative data.

Figure 3:
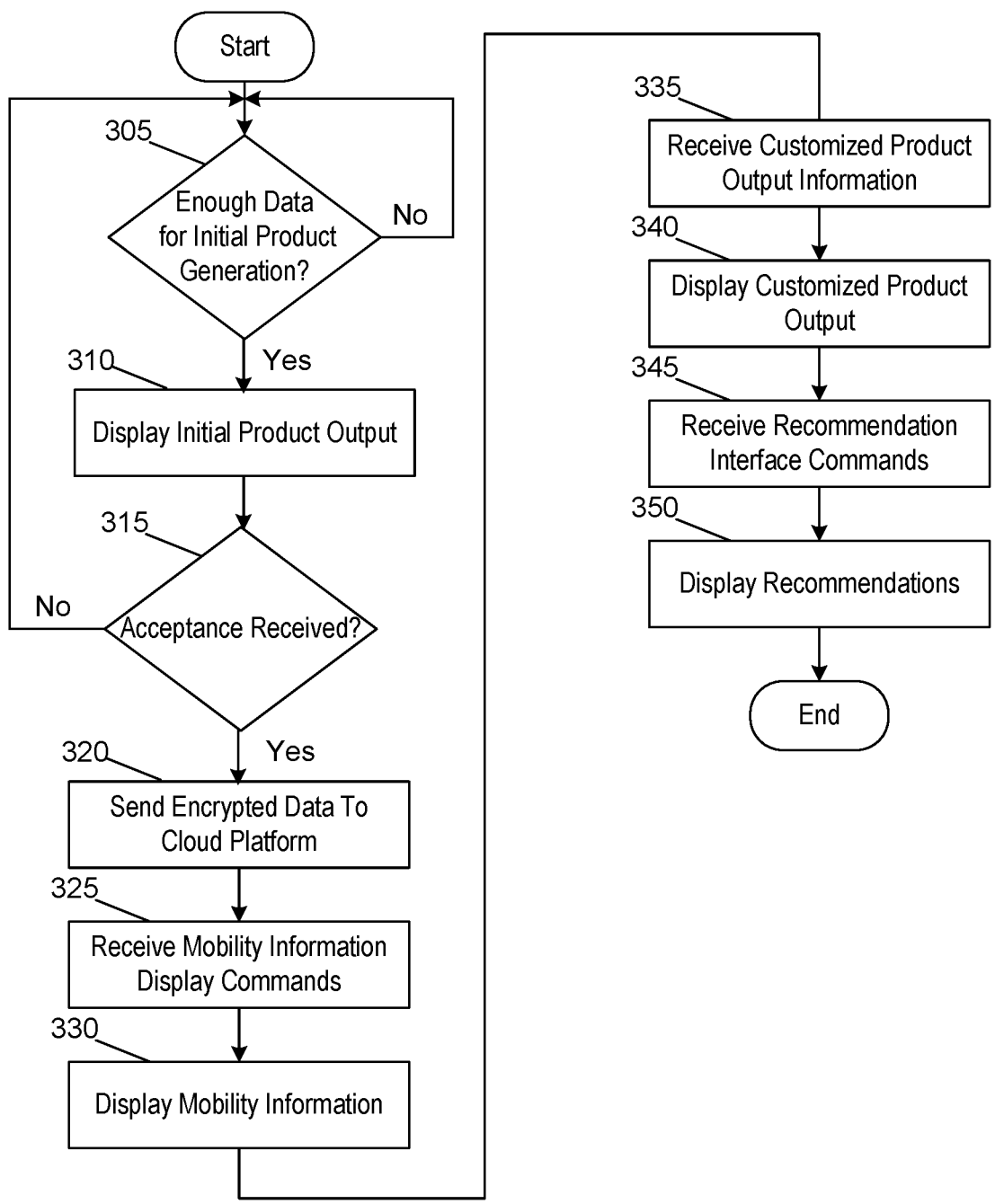
FIGS. 3 and 4 depict illustrative methods for implementing secure data sharing techniques for customized output generation in accordance with one or more example arrangements discussed herein.

FIG. 3 depicts an illustrative method for secure data sharing techniques for customized output generation in accordance with one or more example embodiments. Referring to FIG. 3, at step 305, a computing device having at least one processor, a communication interface, and memory may determine whether enough data is locally stored to generate an initial product output. If not, the computing device may wait until it may be determined that enough data is locally stored to generate an initial product output. If the computing device determines that there is enough data locally stored to generate the customized product output, the computing device may proceed to step 310. At step 310, the computing device may determine and display an initial product output using the locally stored data. In some instances, the computing device may display a series of user interfaces describing a process of linking third party source data for customized product output generation and requesting access to the third party source data. At step 315, the computing device may determine whether access has been granted to the third party source data. If not, the computing device may return to step 305. If access has been granted to the third party source data, the computing device may proceed to step 320. At step 320, the computing device may encrypt third party source data and send it to a cloud computing platform. At step 325, the computing device may receive one or more commands directing the computing device to display one or more mobility insight interfaces. At step 330, the computing device may display the one or more mobility insight interfaces. At step 335, the computing device may receive customized product output information and one or more commands directing the computing device to display the customized product output. At step 340, the computing device may display the customized product output. At step 345, the computing device may receive one or more commands directing the computing device to display a product recommendation interface. At step 350, the computing device may display a product recommendation interface.

Figure 4:
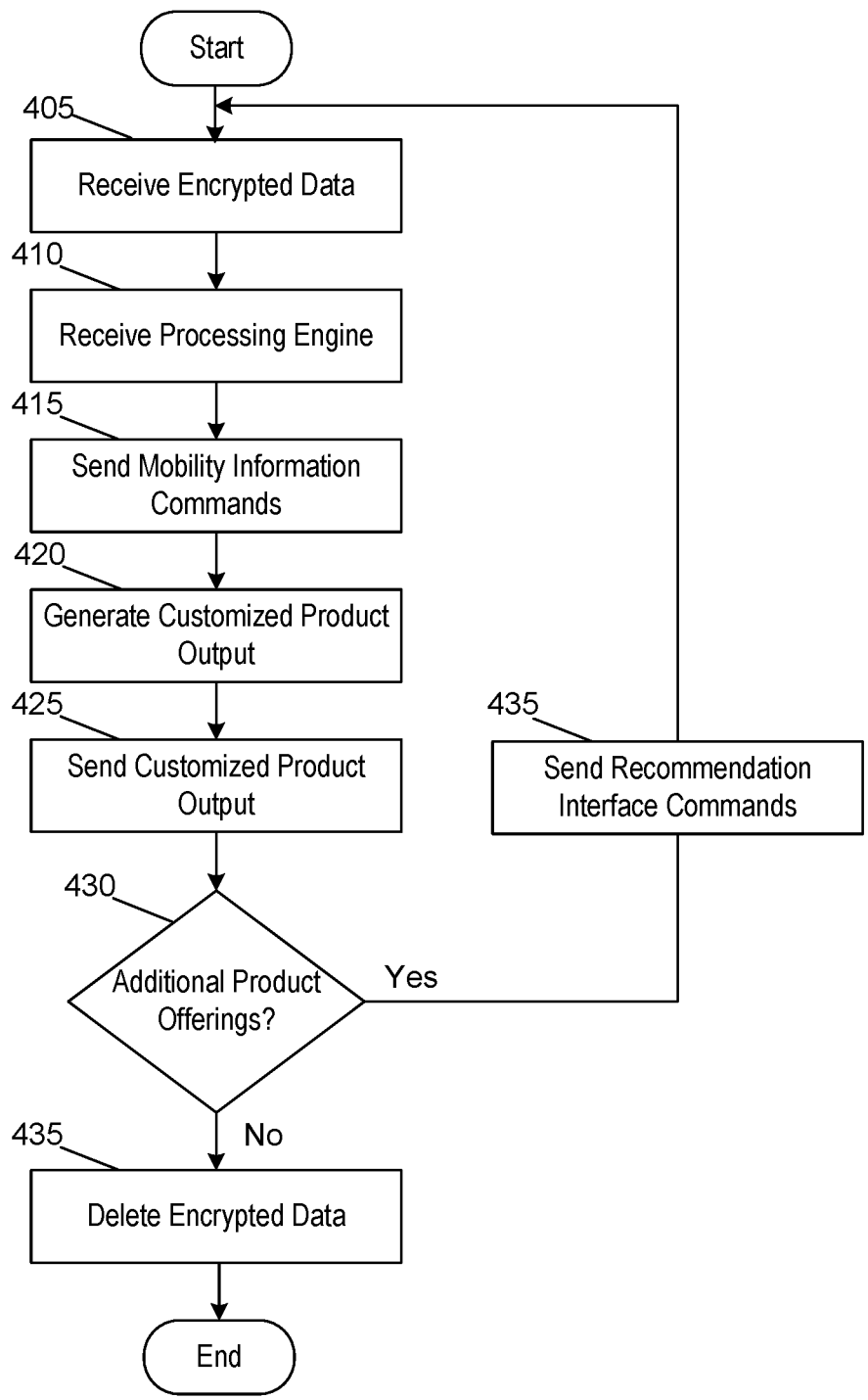

FIG. 4 depicts an illustrative method for secure data sharing techniques for customized output generation in accordance with one or more example embodiments. Referring to FIG. 4, at step 405, a computing platform having at least one processor, a communication interface, and memory may receive encrypted data. At step 410, the computing platform may receive a processing engine from an enterprise server. At step 415, the computing platform may send one or more mobility information display commands. At step 420, the computing platform may generate a customized product output. At step 425, the computing platform may send the customized product output to a user device and/or the enterprise server. At step 430, the computing platform may determine whether additional product offerings should be recommended. If so, the computing platform may proceed to step 435 to send one or more recommendation interface commands. If not, the computing platform may proceed to step 435 to delete the encrypted data.

It should be understood that while the systems and methods described herein in the illustrative event sequence, system diagrams, and methods, are primarily described in the context of insurance sales, the systems and methods described herein may be applied to any number of other industries, products, or the like without departing from the scope of the disclosure. Accordingly, the outlined systems and methods may be applied to a wide variety of use cases beyond insurance.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and memory storing computer-readable instructions that, when executed by the at least one processor, cause the computing platform to:
      receive encrypted data corresponding to a travel history;
      decrypt a portion of the encrypted data, resulting in first decrypted travel history data;
      send, based on the first decrypted travel history data, one or more commands directing a user device of a user corresponding to the travel history to display a graphical user interface that includes one or more insights based on the first decrypted travel history data, along with a first option to continue decrypting a subsequent portion of the encrypted data corresponding to the travel history and a second option to delete the encrypted data and the first decrypted travel history data without decrypting a remainder of the encrypted data;
      decrypt, after receiving a selection of the first option, the subsequent portion of the encrypted data;
      after determining that the encrypted data has been decrypted in its entirety, process the entirety of the decrypted data to generate a customized product output based on the entirety of the decrypted data; and
      send, to the user device and the enterprise server, one or more commands directing display of the customized product output, wherein sending the one or more commands directing display of the customized product output causes one or more of the user device or an enterprise device to display the customized product output.

2. The computing platform of claim 1, wherein the encrypted data is received from one or more of: a user device or a third party data source.

3. The computing platform of claim 1, wherein the encrypted data further includes email data.

4. The computing platform of claim 1, wherein the memory stores additional computer-readable instructions that, when executed by the at least one processor, cause the computing platform to:
   monitor an application on the user device to identify application data, wherein the application corresponds to an enterprise organization corresponding to the enterprise server;
   comparing the identified application data to a predetermined product generation threshold;
   in response to determining that the identified application data exceeds the predetermined product generation threshold:
      determine an initial product output, and
      send one or more commands directing the user device to display the initial product output, wherein sending the one or more commands causes the user device to display the initial product output; and
   in response to determining that the identified application does not exceed the predetermined product generation threshold, continuing to monitor the application until the identified application data exceeds the predetermined product generation threshold.

5. The computing platform of claim 4, wherein the initial product output is a first quote and the customized product output is a second quote, and wherein the customized product output is lower than the initial product output.

6. The computing platform of claim 1, wherein the memory stores additional computer-readable instructions that, when executed by the at least one processor, cause the computing platform to:
   send, to the user device, one or more commands directing display of an additional product recommendation, wherein sending the one or more commands directing display of the additional product recommendation causes one or more of the user device or an enterprise device to display the additional product recommendation and an option to maintain access to the decrypted data for determination of a second customized product output.

7. The computing platform of claim 6, wherein the customized product output comprises a quote for vehicle insurance, the additional product recommendation comprises an indication that a quote for life insurance may be provided, and the second customized product output comprises a quote for life insurance.

8. The computing platform of claim 1, wherein the encrypted data includes one or more of: a user identifier, an upload time, a date range, a number of trips, a total number of miles, an average trip length, a number of miles travelled at night, a number of highway miles travelled, a percentage of trips during which a speed limit was exceeded, a percentage of trips during which a difference between a speed and the speed limit exceeded one or more thresholds, a timestamp and weather data when the difference between the speed and the speed limit exceeded one or more thresholds, a number of miles biked, a number of miles walked, a number of trips taken using a rideshare application, a number of miles driven using a rideshare application, an average length of a rideshare trip, a number of driving miles, locations travelled to more than a predetermined number of times, landmarks within a predetermined distance of the locations, establishments within a predetermined distance of the locations, addresses of the establishments, an amount of time spent driving on trips shorter than a predetermined threshold distance, a total distance travelled on trips shorter than the predetermined threshold distance, an amount of time spent driving on trips longer than the predetermined threshold distance, a total distance travelled on trips longer than the predetermined threshold distance, an amount of time spent driving within a zip code, or an amount of miles driven within the zip code.

9. The computing platform of claim 1, wherein the processing occurs using processing engine uploaded by an enterprise server corresponding to the customized product output and without granting the enterprise server access to the encrypted data or the entirety of the decrypted data.

* * * * *